(12) United States Patent
Chen

(10) Patent No.: US 6,588,784 B1
(45) Date of Patent: Jul. 8, 2003

(54) VERTICAL PEDAL-OPERATED VEHICLE

(76) Inventor: Harvey Cheng-Chung Chen, 4F, No. 115-1, Chiang-Nan Street, Nei-Hu Dist., Taipei City (TW)

( * ) Notice: Subject to any disclaimer, the term of this patent is extended or adjusted under 35 U.S.C. 154(b) by 0 days.

(21) Appl. No.: 10/067,289

(22) Filed: Feb. 7, 2002

(51) Int. Cl.$^7$ ................................................ B62M 1/00
(52) U.S. Cl. ................... 280/221; 280/252; 280/11.115
(58) Field of Search ................................. 280/252, 254, 280/226, 200, 210, 220, 226.1, 11.115, 257, 221; 74/12, 29; 482/51, 52, 57, 66, 70

(56) References Cited

U.S. PATENT DOCUMENTS

| | | | | |
|---|---|---|---|---|
| 684,260 A | * | 10/1901 | Jassmann | 280/11.115 |
| 1,449,643 A | * | 3/1923 | Wenderhold | 280/1.191 |
| 1,556,090 A | * | 10/1925 | Edwards | 280/1.192 |
| 1,566,380 A | * | 12/1925 | Dennison | 280/226.1 |
| 1,628,004 A | * | 5/1927 | Stetson | 280/11.115 |
| 1,652,284 A | * | 12/1927 | Madsen | 280/252 |
| 1,687,715 A | * | 10/1928 | Dahl | 280/221 |
| 2,096,310 A | * | 10/1937 | Schauweker | 280/11.115 |
| 2,707,112 A | * | 4/1955 | Ludwigson et al. | 280/253 |
| 4,445,698 A | * | 5/1984 | Stillwell | 280/11.115 |
| 6,079,724 A | * | 6/2000 | Lin | 188/17 |
| 6,173,981 B1 | * | 1/2001 | Coleman | 280/221 |

FOREIGN PATENT DOCUMENTS

DE         4234309 A1  * 4/1994  ........... B62M/1/04

* cited by examiner

Primary Examiner—Lesley D. Morris
Assistant Examiner—Daniel Yeagley

(57) ABSTRACT

A vertical pedal-operated vehicle can be driven directly by a driver's own weight. To operate such a vehicle, a driver is supposed to apply his/her own weight to the vehicle by treading his/her left and right foot alternately on a pair of pedals such that the rotation torque can be transmitted through a pair of ratchet-typed freewheels with one-way clutch, a driving shaft, then a transmission mechanism to reach at least a rear wheel for driving the vehicle forwards without needing any extra labors, such that a relaxative physical exercise is performable unknowingly. Furthermore, it is possible to make the vertical pedal-operated vehicle compact or foldable for being stuffed and stored in a car's rear baggage compartment for easy delivery.

3 Claims, 6 Drawing Sheets

VERTICAL PEDAL-OPERATED VEHICLE

FIELD OF THE INVENTION

The invention relates to a vertical pedal-operated vehicle provided with a pair of pedals that can be moved up and down vertically by the driver's weight in a reciprocating operation manner.

BACKGROUND OF THE INVENTION

Diversified pedal-operated vehicles in different constructions have been proposed and illustrated since several decades ago. However, at least one or more drawbacks are found in each of the mentioned constructions, in which an obvious common defect is that all the pedals are seemed incapable of moving up and down vertically and exactly to fully meet the driver's requirements.

Therefore, the invention is to provide a real vertical pedal-operated vehicle, on which a driver can stand uprightly and use his/her own weight to depress the pedals up and down stably without needing any driver's extra force, such that a relaxative physical exercise is performable unknowingly. Furthermore, it is possible to make the vertical pedal-operated vehicle compact or foldable for being stuffed and stored in a car's rear baggage compartment for promoting its usage scope.

SUMMARY OF THE INVENTION

A vertical pedal-operated vehicle of the invention is composed of a frame, a handlebar, a central frame member, a front wheel, a pair of rear wheels, and a pair of pedals. A rack is disposed under each pedal and connected thereto respectively, in which each rack is engaged with a ratchet-typed freewheel with one-way clutch, and those two ratchet-typed freewheels with one-way clutch and a main driving gear are together connected to a driving shaft.

When a driver is applying his/her own weight at the first time to the vertical pedal-operated vehicle by treading his/her left foot on the left pedal for example, the right pedal is uplifted in the meanwhile with respect to the sinking left pedal. Consequently, the left rack under the left pedal is depressed downwardly to transmit torque to the left ratchet-typed freewheel with one-way clutch to drive the main driving shaft and accordingly the main driving gear to rotate in a same rotational direction such that the torque is further passed to the pair of rear wheels via a transmission mechanism for driving the vehicle to go forwards.

When the driver treads the second time the right pedal with his/her right foot and at the moment the right pedal is sinking while the left pedal is uplifted, the right rack is driven to displace downwardly and transmit the torque to the right ratchet-typed freewheel with one-way clutch so as to actuate the main driving shaft and accordingly the main driving gear to rotate in a first rotational direction such that the torque is transmitted to the pair of rear wheels via the transmission mechanism for keeping the vehicle go forwards.

At the very moment the left pedal is depressed to sink, the right rack under the uplifting right pedal and connected thereto is displaced upwardly however without transmitting the torque to its engaged right ratchet-typed freewheel with one-way clutch, which hence doesn't substantially impede the rotation of the main driving shaft. And it is also true in the case of depressing the right pedal, thus the vertical pedal-operated vehicle of the invention can be driven forwards stably in an easy way that even a layman who hasn't yet ridden a bicycle can handle it.

For more detailed information regarding advantages or features of the invention, at least an example of preferred embodiment will be fully described below with reference to the annexed drawings.

BRIEF DESCRIPTION OF THE DRAWINGS

The related drawings in connection with the detailed description of the invention to be made later are described briefly as follows, in which.

DETAILED DESCRIPTION OF THE INVENTION

Figure 1:
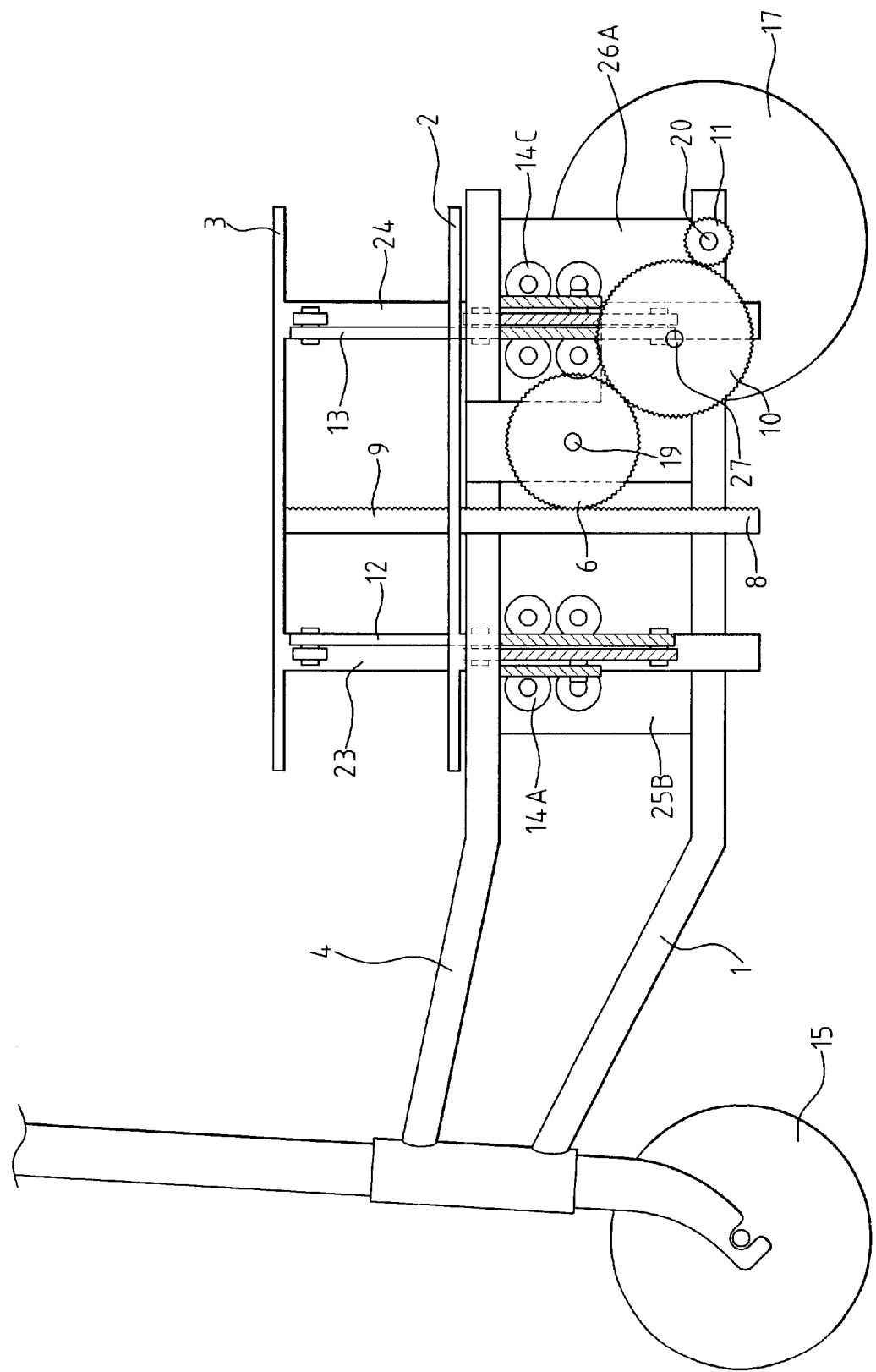
FIG. 1 is a lateral view of a vertical pedal-operated vehicle of the invention showing the link relation of the internal structure thereof.
Figure 2:
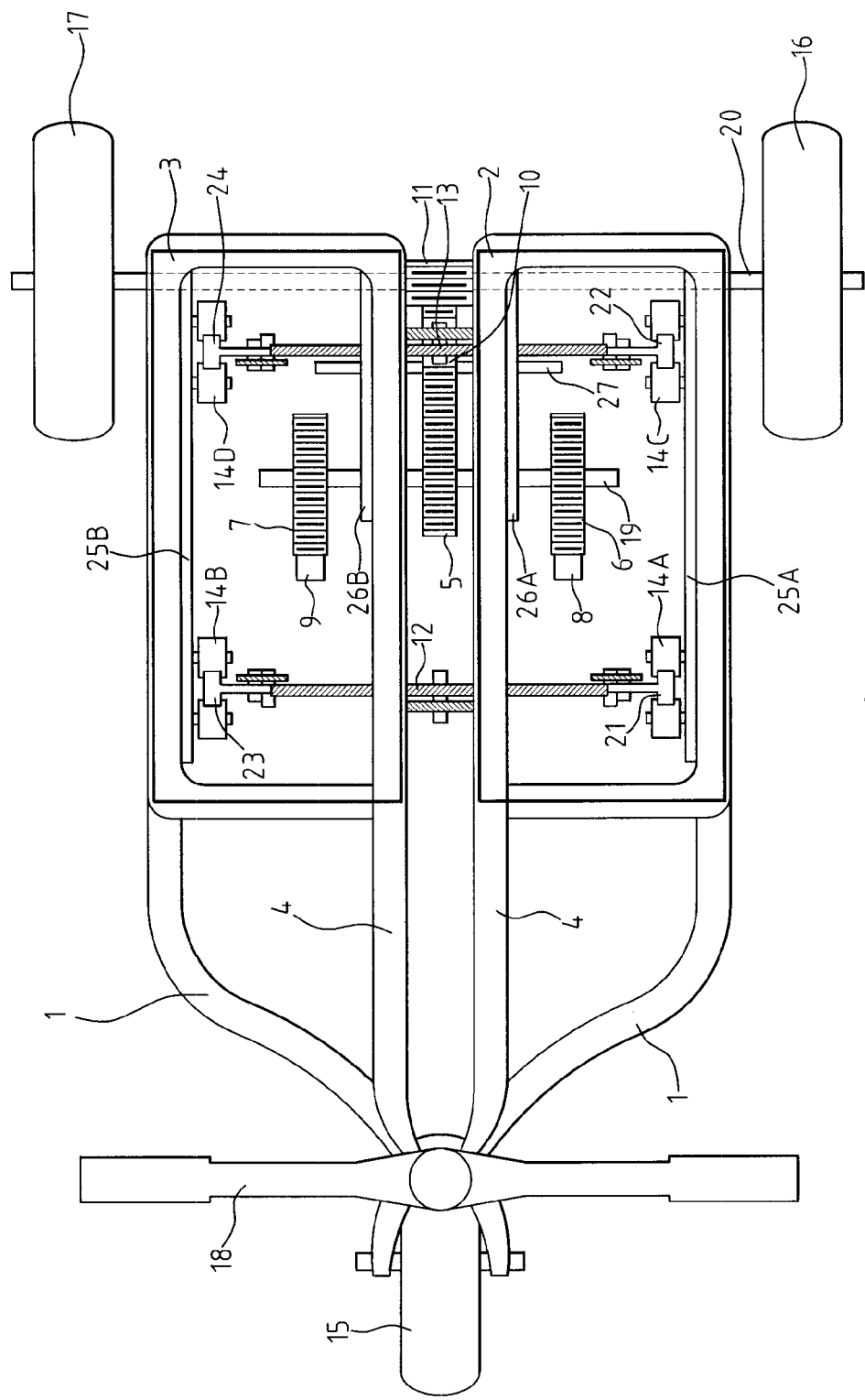
FIG. 2 is a top view of the vertical pedal-operated vehicle of the invention.

As shown in FIGS. 1 through 5, a frame 1 is the main body of a vertical pedal-operated vehicle of the invention, and is composed of a front wheel 15, a pair of rear wheels 16, 17, and a handlebar 18 at the front end of the vertical pedal-operated vehicle above the frame. In addition, the frame 1 further comprises: a central frame member 4 having two lateral walls 25A, 25B fixedly connected with the frame 1; two central walls 26A, 26B arranged at a central portion; and a left and a right pedal 2, 3 disposed above the central frame member 4 but not directly connected thereto. The pedals 2, 3 are jointed with two racks 8, 9 and four pedal-supporting slide levers 21, 22, 23, 24 located thereunder respectively as shown in FIG. 2.

As the pedals 2, 3 are coupled with two quadric chains 12, 13 individually via those four pedal-supporting slide levers 21, 22, 23, 24, which are penetrated individually through four pulley assemblies 14A, 14B, 14C, 14D fixed on the lateral walls 25A, 25B to form a pair of sliding link sets, hence, the pedals 2, 3 can be operated stably without swinging.

Figure 2A:
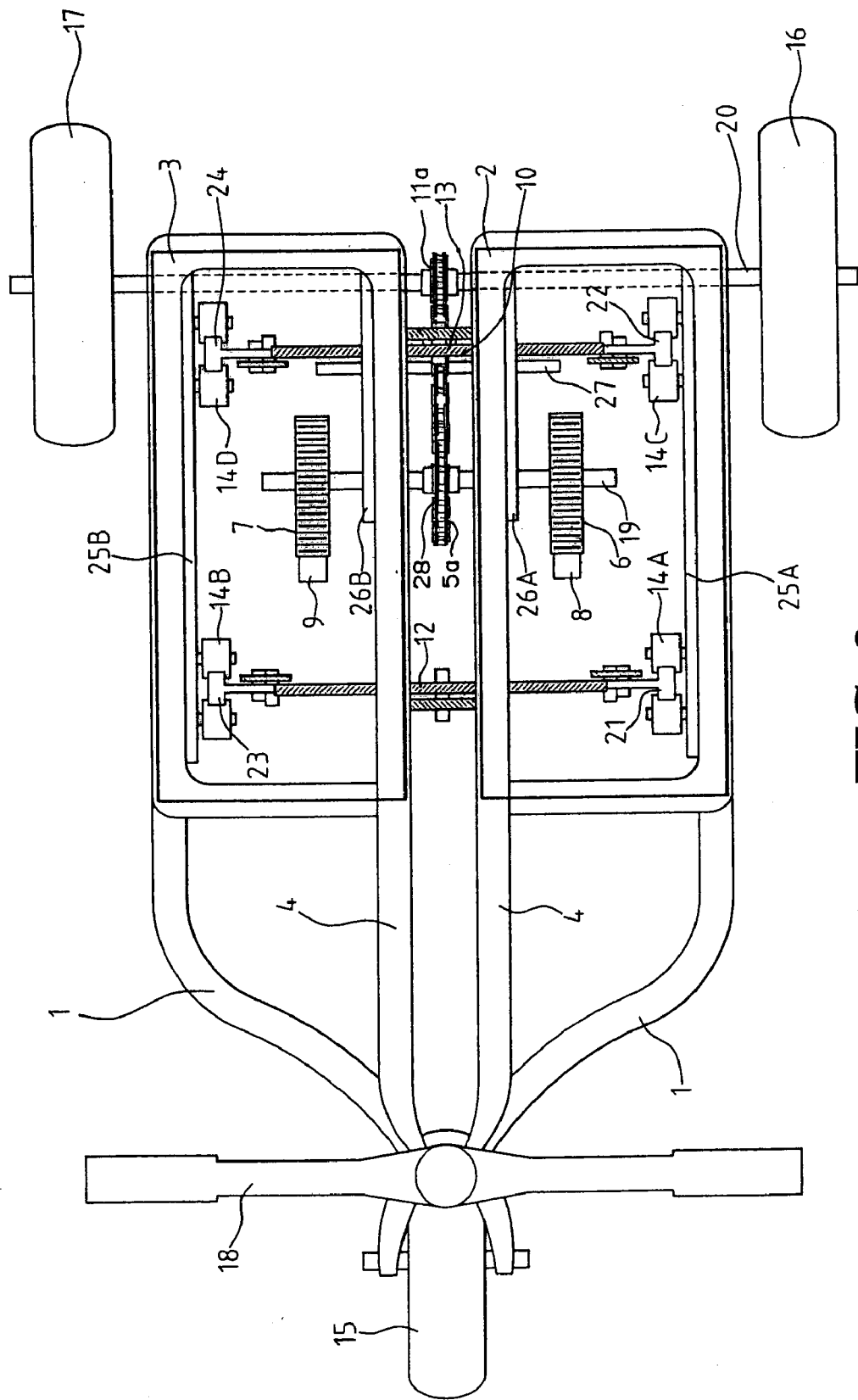
FIG. 2a is a top view of the vertical pedal-operated vehicle of the invention of another embodiment of the invention.
Figure 5:
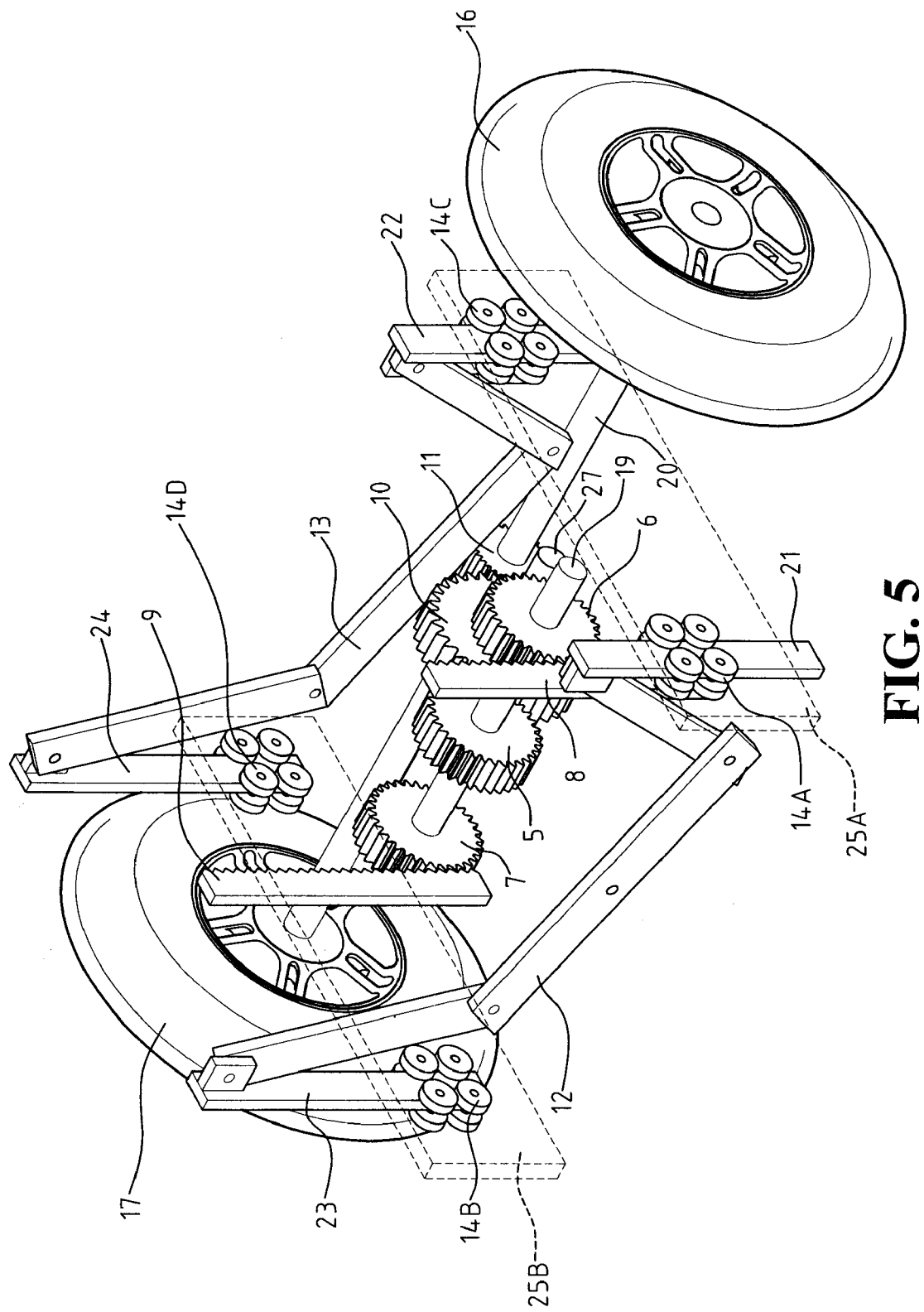
FIG. 5 is a perspective view of the vertical pedal-operated vehicle of the invention.

The racks 8, 9 are engaged with two ratcheted freewheels with one-way clutch 6, 7 (arranged on the outside surface of the central walls 26A, 26B), then jointed with a main driving gear 5 (located between those two central walls 26A, 26B) and connected to a main driving shaft 19. Moreover, the main driving gear 5 is meshed with an idler gear 10, which is then engaged with a pinion 11 to thereby form a transmission mechanism capable of transmitting rotation torque to the pair of rear wheels. Besides, the main driving shaft 19, an idler gear shaft 27, and a rear shaft 20 mounted on a bearing for reducing friction (not shown) are positioned respectively on those two central walls 26A, 26B. Furthermore, the pair of rear wheels 16, 17 and the driven pinion 11 are together connected to the rear shaft 20 as shown in FIG. 5. FIG. 2a is a top plan view of another embodiment of the invention, in which the main driving gear 5 on the main driving shaft 19 is replaced by a driving sprocket wheel 5*a*, and the driven pinion 11 on the rear shaft 20 is replaced by a driven sprocket wheel 11*a*; the drive of the main driving sprocket wheel 5*a* is transmitted to the driven sprocket wheel 11*a* through a chain 28, to drive the pair of rear wheels 16,17.

Figure 3:
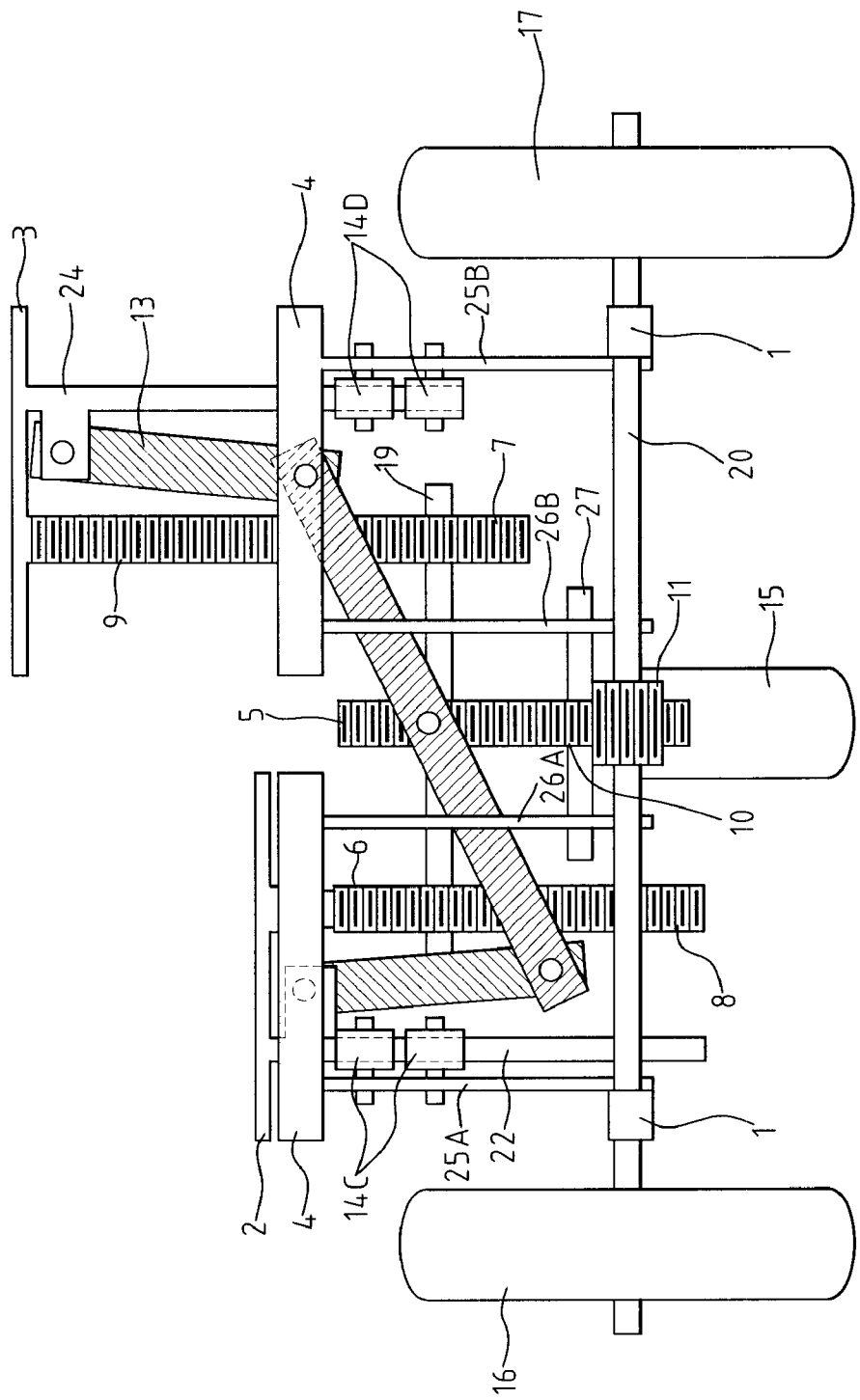
FIG. 3 is a rear view of the vertical pedal-operated vehicle of the invention.
Figure 4:
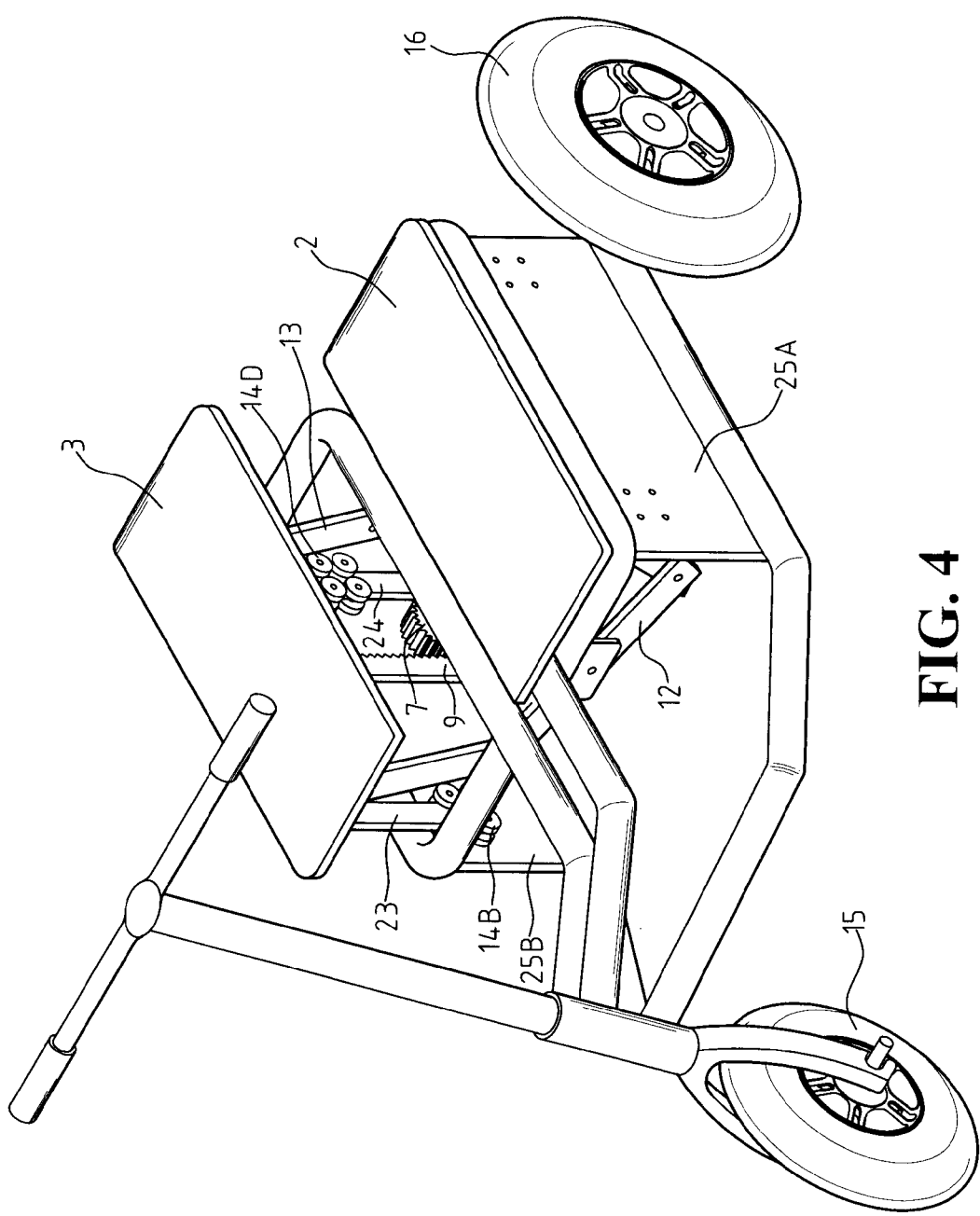
FIG. 4 is a three-dimensional view of the vertical pedal-operated vehicle of the invention.

FIG. 3 is a rear view of the vertical pedal-operated vehicle of the invention for explanation of the vehicle operation in a static state. When a driver is applying his/her own weight at the first time to the vertical pedal-operated vehicle by treading his/her left foot on the left pedal 2 for example, the right pedal 3 is uplifted in the meanwhile with respect to the sinking left pedal 2. Consequently, the left rack 8 under the left pedal 2 is depressed downwardly to transmit torque to the left ratchet-typed freewheel with one-way clutch 6 to drive the main driving shaft 19 and accordingly the main driving gear 5 to rotate in a same rotational direction such that the torque is further passed to the pair of rear wheels via the transmission mechanism for driving the vehicle forwards.

At the very moment the left pedal 2 is sinking, the right rack 9 under the uplifting right pedal 3 and connected thereto is displaced upwardly however without transmitting the torque to its engaged right ratchet-typed freewheel with one-way clutch 7, which hence doesn't substantially impede the rotation of the main driving shaft 19, which is inversely rotated though, for the reason that both the ratchet-typed freewheels with one-way clutch 6, 7 are transmission components for unidirectional transmission only.

Now, suppose the driver treads the second time the right pedal 3 with his/her right foot, and at the moment the right pedal 3 is sinking while the left pedal 2 is uplifted, the right rack 9 is driven to displace downwardly and transmit the torque to the right ratchet-typed freewheel with one-way clutch 7 so as to actuate the main driving shaft 19 and accordingly the main driving gear 5 to rotate in a same rotational direction such that the torque is transmitted to the pair of rear wheels via the transmission mechanism for driving the vehicle forwards. At this time, the left rack 8 doesn't indeed pass the torque to the ratchet-typed freewheel with one-way clutch 6 to interfere the moving direction of the vertical pedal-operated vehicle. Thus, according to the above described, it is possible to keep the vertical pedal-operated vehicle of the invention moving forwards by interchanging a driver's left and right foot for depressing the pedals alternately.

In the above described, at least one preferred embodiment has been described in detail with reference to the drawings annexed, and it is apparent that numerous variations or modifications may be made without departing from the true spirit and scope thereof, as set forth in the claims below.

What is claimed is:

1. A vertical pedal-operated vehicle, comprising:

a frame having a handlebar and a central frame member disposed thereon;

at least two wheels;

a pair of sliding link sets having two quadric chains, four pedal-supporting slide levers and four sets of pulley assembly;

a transmission mechanism including a main driving gear, an idler gear, and a driven pinion;

a front wheel is provided under the handlebar;

at least one rear wheel is arranged at a rear end of the frame;

two pedals disposed on the central frame member and the bottom end of each pedal are connected with a rack and two of the four pedal-supporting slide levers respectively, in which a front and a rear pedal-supporting slide lever are further connected to the quadric chain to form the slide-linking set; each rack under the pedal is engaged with a corresponding ratcheted freewheel with one-way clutch, and those two ratcheted freewheels with one-way clutch are located on two sides of the main driving gear individually and connected to a main driving shaft; and the main driving gear is engaged with the idler gear, which is then meshed with a driven pinion to thus form the transmission mechanism capable of transmitting torque to the rear wheel for driving the vertical pedal-operated vehicle forwards.

2. The vehicle as recited in claim 1, in which the pedal-supporting slide levers jointed with the pedals are penetrated through the pulley assembly fixed on side walls of the frame to form a pair of sliding link sets for the pedals to move up and down stably by taking advantage of the associated quadric chains.

3. The vehicle as recited in claim 1, in which the main driving gear and the driven pinion comprises a driving sprocket wheel and a driven sprocket wheel respectively, and the idler gear comprises a chain.

* * * * *